United States Patent
Laurent et al.

(10) Patent No.: US 6,967,420 B2
(45) Date of Patent: Nov. 22, 2005

(54) ELECTRICAL MACHINE HAVING A ROTOR SPECIALLY ADAPTED TO HIGH SPEEDS

(75) Inventors: Daniel Laurent, La Suisse (CH); Giancarlo Pegoraro, La Suisse (CH)

(73) Assignee: Conception et Developpement Michelin S.A., Givisiez (CH)

( * ) Notice: Subject to any disclaimer, the term of this patent is extended or adjusted under 35 U.S.C. 154(b) by 0 days.

(21) Appl. No.: 10/424,963

(22) Filed: Apr. 28, 2003

(65) Prior Publication Data

US 2004/0004407 A1 Jan. 8, 2004

(51) Int. Cl.$^7$ ................................................ H02K 1/27
(52) U.S. Cl. ......................... 310/156.51; 310/156.53; 310/214; 310/261
(58) Field of Search ............... 310/214, 156.48–156.53, 310/261

(56) References Cited

U.S. PATENT DOCUMENTS

| | | | | |
|---|---|---|---|---|
| 1,996,946 A | * | 4/1935 | Beeh ...................... | 310/156.51 |
| 3,840,763 A | * | 10/1974 | Baumann et al. ...... | 310/156.56 |
| 4,354,126 A | * | 10/1982 | Yates ..................... | 310/156.59 |
| 4,498,024 A | * | 2/1985 | Moretti et al. .................. | 310/59 |
| 4,568,846 A | * | 2/1986 | Kapadia ................. | 310/156.83 |
| 4,588,914 A | * | 5/1986 | Heyne ................... | 310/156.11 |
| 4,633,113 A | * | 12/1986 | Patel ...................... | 310/156.28 |
| 4,658,165 A | * | 4/1987 | Vanderschaeghe ..... | 310/156.57 |
| 4,658,167 A | * | 4/1987 | Popov et al. ........... | 310/156.55 |
| 4,695,754 A | * | 9/1987 | Popov et al. ........... | 310/156.61 |
| 4,697,114 A | * | 9/1987 | Amemiya et al. ...... | 310/156.61 |
| 5,010,266 A | * | 4/1991 | Uchida ................... | 310/156.22 |
| 5,091,668 A | * | 2/1992 | Cuenot et al. .......... | 310/156.61 |
| 5,554,900 A | * | 9/1996 | Pop, Sr. .................. | 310/156.61 |
| 5,684,352 A | | 11/1997 | Mita et al. .................... | 310/156 |
| 5,786,650 A | * | 7/1998 | Uchida et al. .......... | 310/156.55 |
| 6,426,576 B1 | | 7/2002 | Varenne ...................... | 310/156 |
| 2002/0047424 A1 | | 4/2002 | Varenne | |

FOREIGN PATENT DOCUMENTS

| | | | | |
|---|---|---|---|---|
| EP | 0381769 | 8/1990 | .......... | H02K/21/08 |
| FR | 2084279 | 12/1971 | ............ | H02K/1/00 |

OTHER PUBLICATIONS

Patent Abstract of Japan publication No. JP 11332146, Nov. 30, 1999.

* cited by examiner

*Primary Examiner*—Burton Mullins
(74) *Attorney, Agent, or Firm*—Fitzpatrick, Cella, Harper & Scinto

(57) ABSTRACT

An electrical rotating machine having a rotor comprising a shaft made from non-magnetic material, a plurality of pole pieces made from magnetic material and surrounding the shaft, with permanent magnets fixed in receivers by wedges cooperating with the pole pieces to block radially outward movement of the magnets.

16 Claims, 4 Drawing Sheets

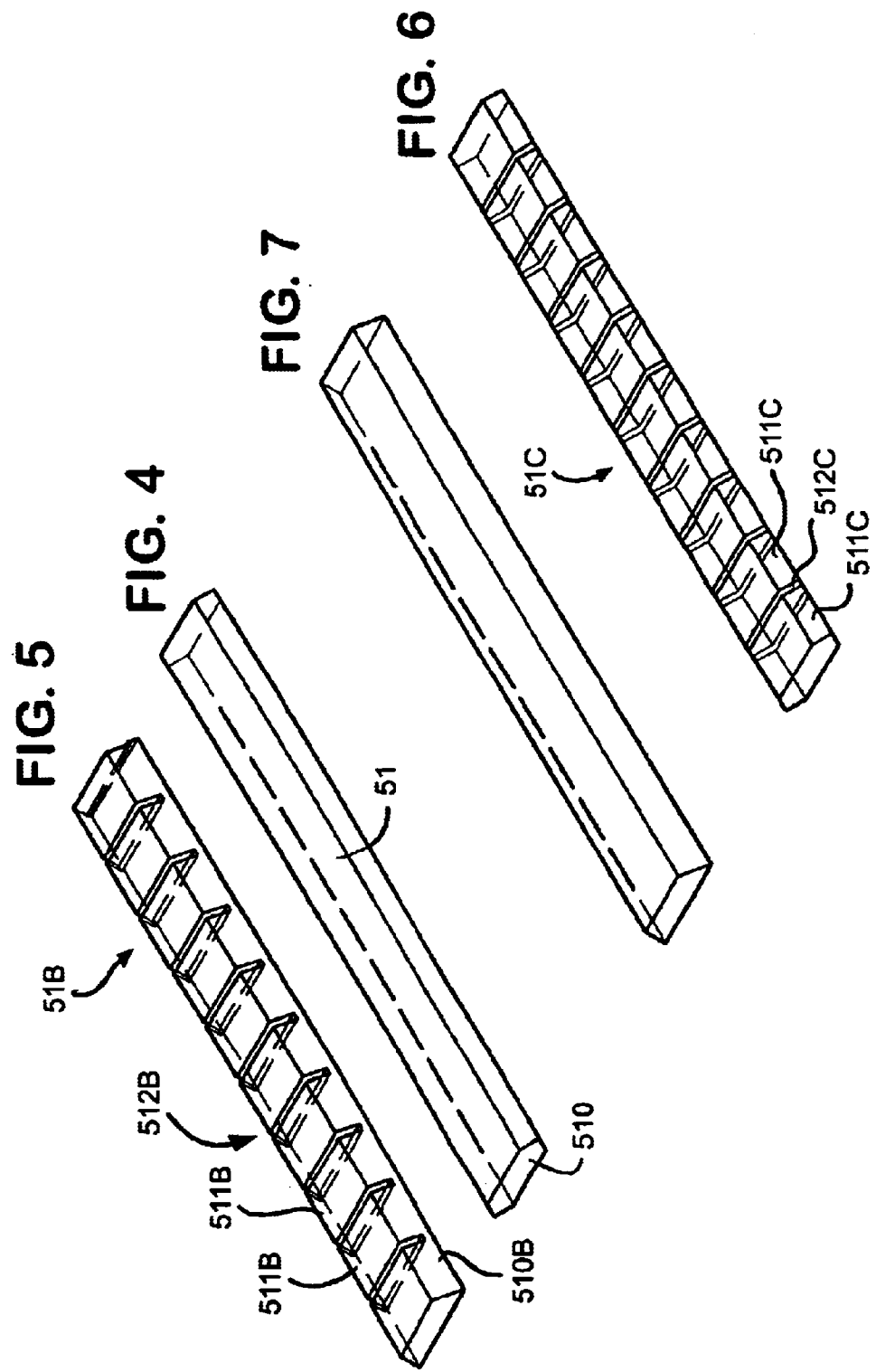

ELECTRICAL MACHINE HAVING A ROTOR SPECIALLY ADAPTED TO HIGH SPEEDS

BACKGROUND OF THE INVENTION

1. The Field of the Invention

The invention relates to electrical rotating machines wherein the rotor has permanent magnets. More particularly, the invention relates to machines in which the magnets are disposed in recesses in the rotor. The electrical machines in question are commonly called embedded magnet machines. This principle of arrangement for the rotor is widely applied to brushless synchronous machines with flux concentration.

2. The Related Art

The size of an electrical rotating machine depends on its nominal torque. The higher the torque a motor is capable of delivering, the more bulky the electric motor, all other things being equal. There are, however, applications for which it is desirable to obtain both high power levels and a highly compact construction of the motor at the same time. To give just one concrete example, when the intention is to install electric traction motors in the wheels of automotive vehicles, it is desirable to be able to develop power levels of at least 10 kW per motor, and even at least 25 or 30 kW per motor for the majority of the time, for a weight as low as possible in order not to make the unsprung masses too heavy. It is also desirable for the bulk to be very small, going as little as possible beyond the internal volume of the wheel so as not to interfere with the elements of the vehicle in the event of flexing of the suspension and in the event of other types of movement of the wheel with respect to the vehicle body.

These two requirements (high power level, and low weight and bulk) make it very problematic to install electric traction motors in the wheels of private vehicles without a radical improvement in the ratio of weight to power of the electrical machines currently available on the market.

The selection of a high speed at the design stage of an electric motor is one solution which, for a given power, allows the torque and hence the bulk to be reduced. In other words, for a nominal power of a given motor, the greater its nominal speed of rotation, the smaller its bulk will be. However, increasing the speed of rotation of an electrical rotating machine poses numerous problems for the mechanical behavior, and these are particularly difficult if the intention is to keep the weight and bulk of the electrical rotating machine as small as possible.

A specific construction intended to achieve high speeds of rotation has already been proposed in U.S. Pat. No. 6,426,576. The speeds contemplated in this patent application are in the order of 12,000 rpm, and to achieve this a particular arrangement is proposed for the whole assembly comprising a non-magnetic polygonal monobloc shaft and pole pieces which are judiciously disposed around this shaft.

If the speed of rotation is increased further, problems arise with the mechanical behavior of the magnets. The radially outer end thereof is at risk of breaking up. Pieces of magnet are at risk of being spun off, which seems to indicate that internal-rotor machines reach a speed ceiling at the levels of speed of rotation mentioned above.

SUMMARY OF THE INVENTION

The object of the invention is to propose a construction for an electrical rotating machine having an internal rotor and an external stator, which allows much higher speeds of rotation to be achieved without encountering the problem of the magnets spinning off the rotor.

The invention proposes an electrical rotating machine comprising an external stator and an internal rotor, having an air gap between the rotor and the stator, in which the rotor comprises:

a shaft mounted on the stator by means of bearings, at least the outer casing of the shaft being made from non-magnetic material, and the bearings defining the axis of rotation of the shaft;

a plurality of pole pieces of magnetic material surrounding the shaft, each pole piece having a radially inner edge in contact with the surface of the shaft and a radially outer edge adjacent to the air gap, the pole pieces delimiting circumferentially-spaced receivers therebetween;

a lateral flange at either axial side of the pole pieces, with the shaft passing through each lateral flange by means of a central recess in the lateral flange, at least one tie rod for each pole piece, the tie rod clamping each pole piece between the lateral flanges, a permanent magnet installed in each receiver; and a wedge cooperating with shoulders disposed on each of the adjacent pole pieces, so as to block radially outward movement of the magnet installed in the receiver between said adjacent pole pieces.

Thus, the receiver of each magnet is closed off radially on the outer side. This allows much higher speeds of rotation to be achieved without damaging the magnets. It should be noted that pole pieces are preferably formed by a stack, in the axial direction, of ferromagnetic base sheets cut to the desired shape. All of the sheets are disposed substantially perpendicular to the axis of the shaft.

BRIEF DESCRIPTION OF THE DRAWINGS

The invention will be better understood from the following description of exemplary embodiment thereof, taken together with the accompanying drawings, in which:

FIG. 4 is a detail view of a wedge of a machine according to the invention;

FIG. 5 shows a first variant of the wedge;

FIG. 6 shows a second variant of the wedge; and

FIG. 7 shows a third variant of the wedge.

DETAILED DESCRIPTION OF EXEMPLARY EMBODIMENTS

Figure 1:
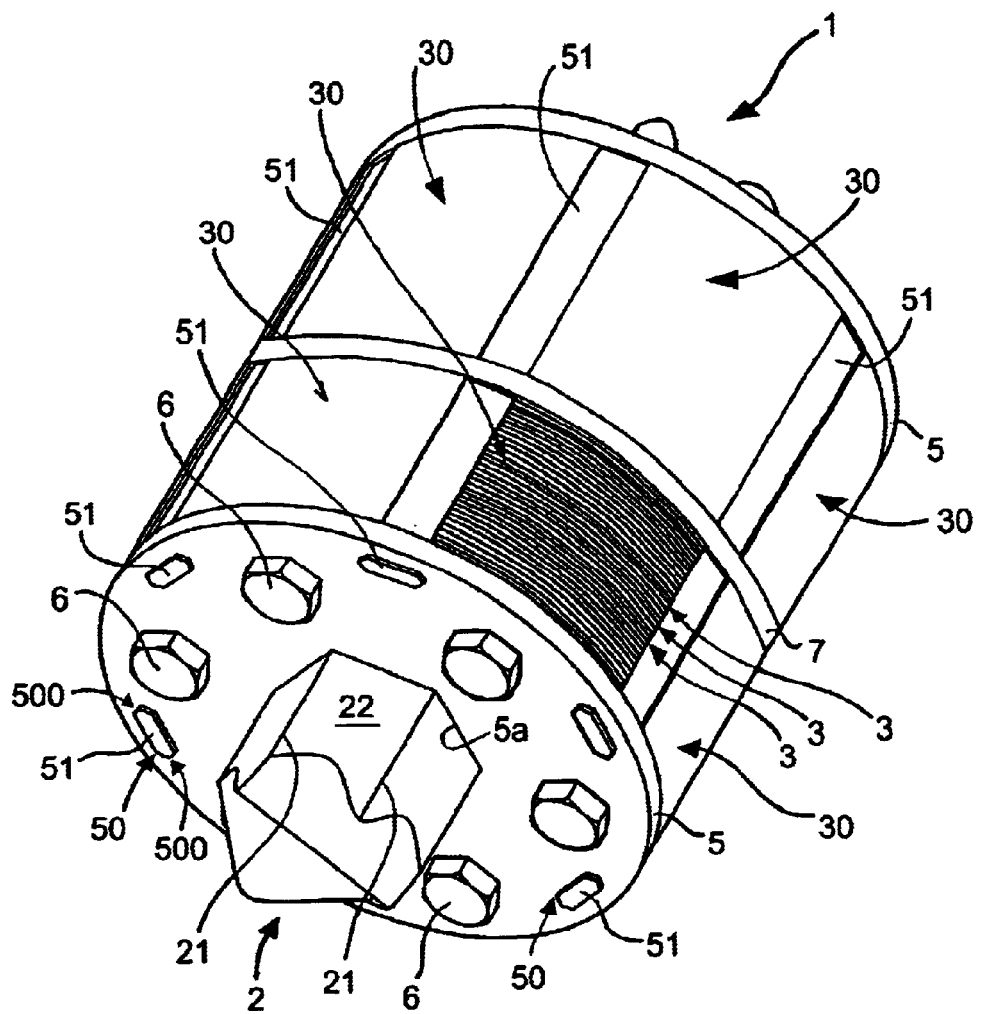
FIG. 1 is a perspective view showing one embodiment of the rotor of a machine according to the invention.
Figure 2:
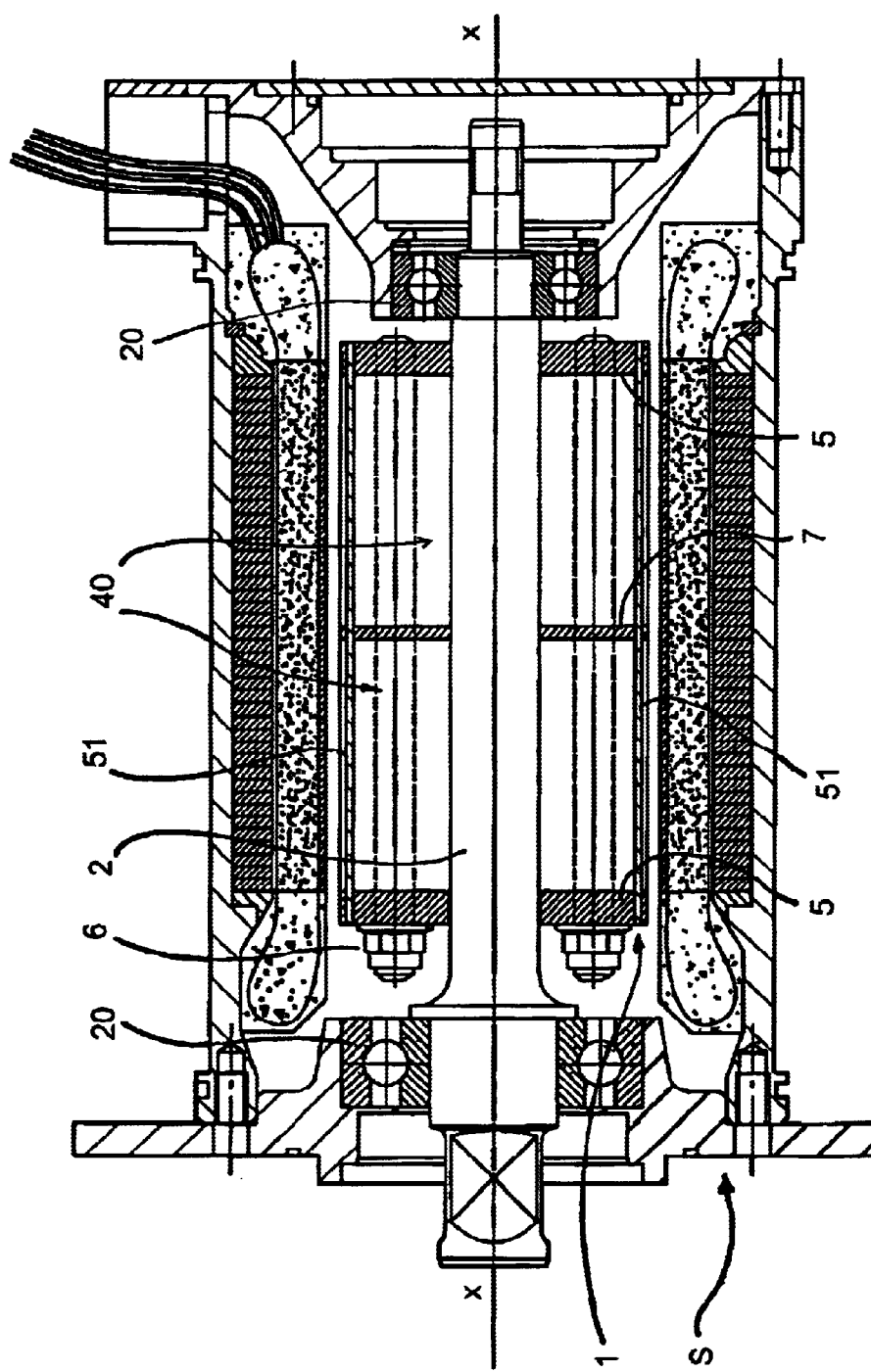
FIG. 2 is a longitudinal sectional view showing the rotor and the stator of an embodiment of a machine according to the invention, with the plane of section passing through the axis of rotation of the machine and through the receivers for a magnet.
Figure 3:
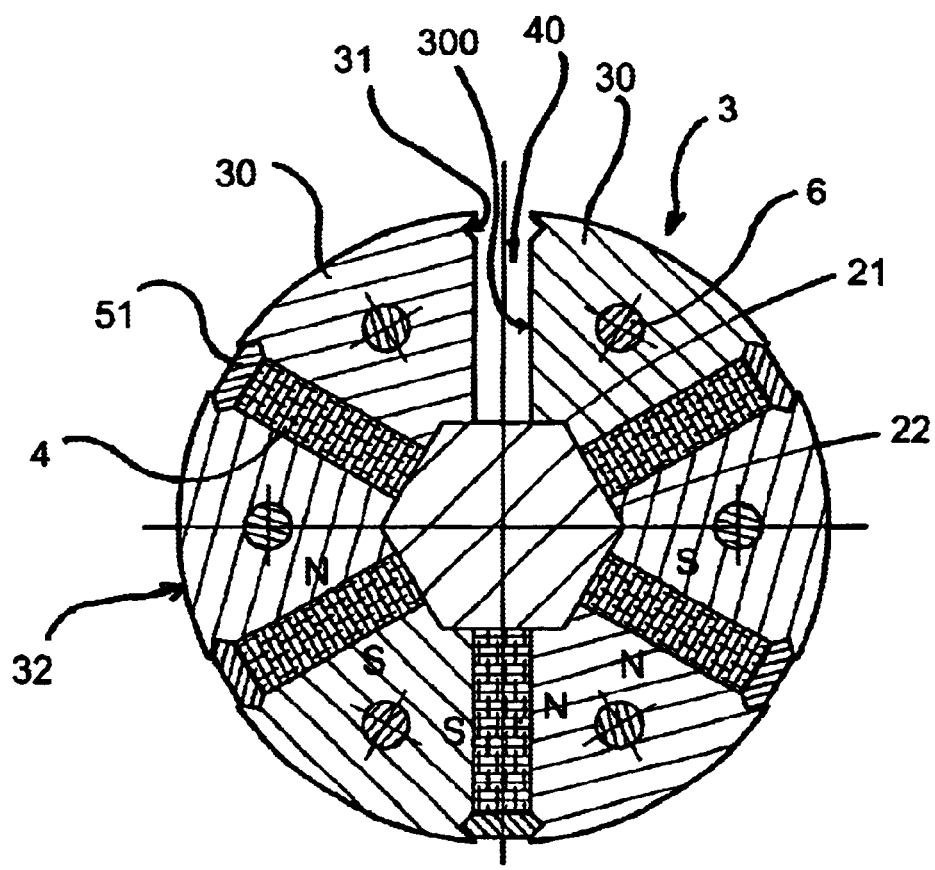
FIG. 3 is a cross-sectional view showing the rotor of an embodiment of a machine according to the invention, with the plane of section perpendicular to its axis of rotation, one magnet being omitted for clarity.

In FIGS. 1 to 3, there is illustrated a six-pole machine having a stator S (shown in FIG. 2) and a rotor 1, with a shaft 2 resting on bearings 20. At least an outer casing of the shaft 2, or the shaft in its entirety, is made of non-magnetic material. The rotor 1 includes a stack of ferromagnetic sheets 3, forming, as shown, six pole pieces 30. Each sheet 3 is substantially perpendicular to the axis of the shaft. It should be noted that the invention is also useful in the case of solid (not laminated) pole pieces.

Axially adjacent either end of the shaft 2 there is shown a lateral flange 5 (preferably made from non-magnetic material) located on either side of the pole pieces 30. Also shown is an optional intermediate plate 7 (preferably made from non-magnetic material). Each lateral flange 5 and, where applicable, each intermediate plate 7 has a central recess 5a. In the non-restrictive example described here, the central recess is polygonal in shape. The shape of the recess is adapted to the external configuration of the shaft 2. For each of the pole pieces 30, a tie rod 6 passes through the stack of sheets 3 and, where applicable the intermediate plate or plates 7, and allows the whole unit to be clamped between the lateral flanges 5.

Permanent magnets 4 (FIG. 3) are disposed in receivers 40 between the pole pieces 30. One receiver 40 appears more clearly in FIG. 3, where one magnet is omitted for clarity. Also, the magnets are absent from the receivers 40 in the plane of section of FIG. 2. The pole pieces 30 have longitudinal faces 300 oriented parallel to the axis of rotation of the rotor. These longitudinal faces 300 delimit the receivers 40 receiving the magnets 4. The radially outer edge 32 of each sheet 3 describes an arc centered on the axis of the rotor. The section of the shaft 2 perpendicular to the axis of rotation is in the shape of a convex polygon. The convex polygonal shape has planar faces 22 separated by edges 21 (FIG. 1). The magnets 4 are in direct contact with the shaft 2 at each of the planar faces 22 of the shaft. For a more detailed description, reference is made to the aforementioned U.S. Pat. No. 6,426,576, the disclosure of which is hereby incorporated by reference for all purposes. All of the features described there may also be used in combination with the present invention, although the utility of the latter is not restricted to a combination of this kind.

Each of the receivers 40 for the magnets 4 is closed off at its radially outer end by a wedge 51 (see FIGS. 1, 2 and 3). Two wedges 51 are also shown in FIG. 2. As shown in FIG. 1, each wedge 51 passes through openings 50 in the peripheries of the lateral flanges 5, opposite the receivers 40 containing the magnets 4. The same is true for any intermediate plate or plates 7 provided.

Moreover, the longitudinal faces 300 of the pole pieces 30 each have a groove 31 which is parallel to the axis of the rotor and is hollowed out of each of the longitudinal faces 300 of the pole pieces at a point close to the outer edge 32 of each pole piece 30, with the pole pieces moreover being of a height which is (radially) slightly greater than the height of the magnets 4. Each wedge 51 is captured between and bears against two grooves 31 disposed on the adjacent pole pieces 30. The magnets 4 are thus made mechanically integral with the pole pieces 30. The essential function of each groove 31 is to form a shoulder to prevent the wedges 51, and consequently the magnets, from spinning off. The pole pieces 30 are themselves mechanical integrated with the shaft 2 thanks to the tie rods 6 and the lateral flanges 5 and, where applicable, the intermediate plate(s) 7. The rotor can, without damage, withstand very high speeds of rotation, far greater than 10,000 rpm, namely speeds on the order of at least 20,000 rpm.

The resistance of an assembly of this kind to spinning off has proved so effective that it is even possible to conceive of no longer having to cement the magnets 4 in their receivers 40, which makes manufacture of the rotor simpler. Thus, in a particular but advantageous embodiment of the invention, the rotor has no cement between each magnet 4 and the adjacent parts.

Each groove 31 is aligned with the circumferential ends 500 of the openings 50 in the lateral flanges 5. Similarly, each groove 31 is aligned with the circumferential ends (not shown in the drawings) of similar openings made in any intermediate plate or plates 7.

Upon assembly, the overall assembly formed by the pole pieces 30, the lateral flanges 5, any intermediate plate or plates 7, and the tie rods 6 is first installed around the shaft 2. Then the magnets 4 are inserted into the receivers 40, slid radially through the radially outer opening in each receiver 40, until they are in contact with the shaft 2. Finally, the outer opening of each receiver is closed off by means of a wedge 51: an end 510 (FIG. 4) of each wedge 51 may be inserted into one of the openings 50 in one of the lateral flanges 5, and it is then slid along the opposed grooves 31 parallel to the rotational axis until the end 510 is inserted into the corresponding opening in the opposed lateral flange 5.

It goes without saying that the details of the embodiments given above are not restrictive. It is clear that the openings 50 are not mandatory to make each wedge 51 mechanically integral with the pole pieces 30. As a further variant, it is possible to provide only blind bores in the axially inner surfaces of the flanges 5 which receive the wedges 51 and contribute to holding them radially. It is also quite clear that assembly of the wedges 51, as for the other component parts, could be different: for example, the wedges 51 could be disposed in the grooves 31 of the pole pieces 30 before the lateral flanges 5 are assembled. Fitting the wedges 51 onto the lateral flanges 5 provides for great ease of assembly, but this arrangement is not imperative for the magnets 4 to behave properly; all that is required for that is for the wedges 51 to cooperate mechanically with the pole pieces 30.

Moreover, a magnetic short circuit which would prevent all or part of the magnetic flux produced by the magnets in the rotor from circulating to the stator and cooperating with the flux produced by the stator currents must be avoided. One solution is for each wedge 51 to be made from non-magnetic material. Non-magnetic material may be selected from the group formed by composite materials, aluminum alloys, non-magnetic steels, ceramics and titanium. Furthermore, the occurrence of eddy currents must be prevented or their magnitude limited, so that the efficiency of the machine is not impaired. One solution is for each wedge 51 to be made from a material that does not conduct electricity. For example, a composite material of sufficiently high mechanical strength to withstand the large stresses occurring during rotation at high speed is used. A wedge 51 of this kind is for example shown in FIG. 4. FIG. 7 shows another example of a wedge of this kind whereof the shape is trapezoidal in section, the intention being to demonstrate that the shape of the wedge section appearing in FIGS. 1, 3 and 4 is not restrictive. The cross section of the openings 50 in the flanges 5 (7) would of course correspond to the cross section of the wedges 51.

In the variants of the wedge illustrated in FIGS. 5 and 6 there is proposed another arrangement allowing the use of wedges made of non-magnetic materials which conduct electricity. The wedge 51B in FIG. 5 in is the shape of a thin base 510B elongated in the direction parallel to the rotational axis and topped by a plurality of blocks 511B which are longitudinally adjacent and separated by slots 512B. The blocks 511B are thus not in contact with one another. Although the material is electrically conductive, because of the very small thickness of the base 510 the eddy currents remain minimal, with only negligible effect on the efficiency of the machine. It is advantageous for the longitudinal dimension of the blocks 511B to be as small as possible. The thickness of the wedge in the radial direction is of a dimension to be sufficient to withstand mechanical stresses in operation.

The variant embodiment shown in FIG. 6 is a wedge 51C having a plurality of adjacent elements 511C which are aligned longitudinally, made from a material which conducts electricity and cemented to one another by means of a material 512C which does not conduct electricity. It is advantageous for the longitudinal dimension of the elements 511C to be as small as possible. Consequently, eddy currents again remain minimal.

Although the invention has been described herein by reference to specific embodiments thereof, it will be understood that all such embodiments are susceptible of modification and variation without departing from the inventive concepts disclosed. All such modifications and variations, therefore, are intended to be included within the spirit and scope of the appended claims.

What is claimed is:

1. An electrical rotating machine comprising an external stator and an internal rotor, having an air gap between the rotor and the stator, in which the rotor comprises:
   a shaft mounted on the stator by means of bearings, at least the outer casing of the shaft being made of non-magnetic material, and the bearings defining the axis of rotation of the shaft;
   a plurality of pole pieces of magnetic material surrounding the shaft, each pole piece having a radially inner edge in contact with the surface of the shaft and a radially outer edge adjacent to the air gap, the pole pieces delimiting circumferentially-spaced receivers therebetween;
   a lateral flange at either axial side of the pole pieces, with the shaft passing through each lateral flange by means of a central recess in the lateral flange;
   at least one tie rod for each pole piece, the tie rod clamping each pole piece between the lateral flanges;
   a permanent magnet installed in each receiver; and
   a wedge cooperating with shoulders disposed on the longitudinal surfaces of adjacent pole pieces so as to block radially outward movement of the magnet installed in the receiver between said adjacent pole pieces,
   wherein each wedge is made from a material which conducts electricity and is formed by a thin base elongated in a direction parallel to the rotational axis of the shaft and topped by a plurality of blocks which are longitudinally adjacent and not in contact with one another.

2. A machine according to claim 1, in which each shoulder is formed by means of a groove which is parallel to the axis of the rotor and is hollowed out of the longitudinal faces of the adjacent pole pieces at a point close to the outer edge of each pole piece.

3. A machine according to claim 1, in which each wedge is made from nonmagnetic material.

4. A machine according to claim 3, in which the wedge non-magnetic material is selected from the group formed by composite materials, aluminum alloys, non-magnetic steels, ceramics and titanium.

5. A machine according to claim 1, in which the rotor has no cement between each magnet and the adjacent parts.

6. A machine according to claim 1, in which the shaft, seen in section perpendicular to the axis of rotation, is in the shape of a convex polygon having planar faces separated by edges.

7. A machine according to claim 1, in which each pole piece is comprised of a stack of ferromagnetic sheets, each sheet being disposed substantially perpendicular to the rotational axis of the shaft.

8. A machine according to claim 1, in which the permanent magnets are in direct contact with the shaft.

9. An electrical rotating machine comprising an external stator and an internal rotor, having an air gap between the rotor and the stator, in which the rotor comprises:
   a shaft mounted on the stator by means of bearings, at least the outer casing of the shaft being made of non-magnetic material, and the bearings defining the axis of rotation of the shaft;
   a plurality of pole pieces of magnetic material surrounding the shaft, each pole piece having a radially inner edge in contact with the surface of the shaft and a radially outer edge adjacent to the air gap, the pole pieces delimiting circumferentially-spaced receivers therebetween;
   a lateral flange at either axial side of the pole pieces, with the shaft passing through each lateral flange by means of a central recess in the lateral flange;
   at least one tie rod for each pole piece, the tie rod clamping each pole piece between the lateral flanges;
   a permanent magnet installed in each receiver; and
   a wedge cooperating with shoulders disposed on the longitudinal surfaces of adjacent pole pieces so as to block radially outward movement of the magnet installed in the receiver between said adjacent pole pieces,
   wherein each wedge is formed by a plurality of adjacent blocks which are aligned longitudinally, made from a material which conducts electricity, and cemented to one another by means of a material which does not conduct electricity.

10. A machine according to claim 9, in which each shoulder is formed by means of a groove which is parallel to the axis of the rotor and is hollowed out of the longitudinal faces of the adjacent pole pieces at a point close to the outer edge of each pole piece.

11. A machine according to claim 9, in which each wedge is made from nonmagnetic material.

12. A machine according to claim 11, in which the wedge non-magnetic material is selected from the group formed by composite materials, aluminum alloys, non-magnetic steels, ceramics and titanium.

13. A machine according to claim 9, in which the rotor has no cement between each magnet and the adjacent pans.

14. A machine according to claim 9, in which the shaft, seen in section perpendicular to the axis of rotation, is in the shape of a convex polygon having planar faces separated by edges.

15. A machine according to claim 9, in which each pole piece is comprised of a stack of ferromagnetic sheets, each sheet being disposed substantially perpendicular to the rotational axis of the shaft.

16. A machine according to claim 9, in which the permanent magnets are in direct contact with the shaft.

* * * * *